(12) United States Patent
Shore

(10) Patent No.: US 7,207,578 B2
(45) Date of Patent: Apr. 24, 2007

(54) DOLLY FOR DOCK PLATES

(76) Inventor: Larry H. Shore, 570 Westwood Dr., Big Lake, MN (US) 55309

( * ) Notice: Subject to any disclaimer, the term of this patent is extended or adjusted under 35 U.S.C. 154(b) by 245 days.

(21) Appl. No.: 11/069,949

(22) Filed: Mar. 3, 2005

(65) Prior Publication Data

US 2006/0197298 A1 Sep. 7, 2006

(51) Int. Cl.
*B62B 3/10* (2006.01)

(52) U.S. Cl. .................. 280/79.7; 280/47.34

(58) Field of Classification Search ............ 280/43.11, 280/47.23, 47.24, 47.34, 79.7, 79.11, 79.3
See application file for complete search history.

(56) References Cited

U.S. PATENT DOCUMENTS

| | | | |
|---|---|---|---|
| 2,503,388 A * | 4/1950 | Hedlund | 414/10 |
| 3,090,635 A | 5/1963 | Masterson, Jr. | |
| 3,306,624 A | 2/1967 | Goss | |
| 3,580,601 A | 5/1971 | Miles | |
| 3,717,357 A * | 2/1973 | Schaefer | 280/35 |
| 4,630,838 A * | 12/1986 | Stockton | 280/47.17 |
| 4,793,624 A * | 12/1988 | Mace | 280/47.16 |
| 4,968,049 A * | 11/1990 | Johnson | 280/47.24 |
| 5,486,014 A * | 1/1996 | Hough | 280/79.11 |
| 5,507,509 A | 4/1996 | Della Polla, Jr. | |
| 5,609,461 A * | 3/1997 | Lichtenberg | 414/426 |
| 5,927,731 A | 7/1999 | Clarke | |
| 6,102,645 A * | 8/2000 | Kooima et al. | 414/537 |
| 6,505,844 B2 * | 1/2003 | Hallman et al. | 280/79.7 |
| 2002/0113390 A1 | 8/2002 | Hallman et al. | |

* cited by examiner

*Primary Examiner*—Christopher Bottorff
(74) *Attorney, Agent, or Firm*—Richard C. Litman

(57) ABSTRACT

A dolly for dock plates has an elongate frame and plate edge receiver having a horizontal bottom wall and angled sidewalls extending upward and outward to an upper edge. Front and rear pairs of flanges extend from front and rear portions of the elongate frame at the upper edges thereof for supporting front and rear pairs of castors. The front castors are fixed parallel to the frame, while the rear castors are of the swivel type, allowing change of direction of the dolly. The bottom wall of the frame supports the lower edge of the dock plate during moving and the angled sidewalls allow the dock plate to be stored on the dolly while the dock plate is leaned against a wall for storage. The bottom wall of the frame is at about the height of the castor wheel axles or below for stability.

12 Claims, 5 Drawing Sheets

DOLLY FOR DOCK PLATES

BACKGROUND OF THE INVENTION

1. Field of the Invention

The present invention relates to dollys. More particularly, the present invention relates to a dolly for moving and storing a dock plate.

2. Description of the Related Art

Dollys used for moving articles are made in a variety of configurations. Some are for general use such as flat dollys for moving furniture or goods. These dollys may be elongate, having a rear-mounted handle for pushing the dolly loaded with boxes or the like. Others rely on friction of the moved piece to move the dolly, the moving force being applied to the item such as a piece of furniture. Some dollys are designed to move a particular item or class of similarly shaped items.

Dock plates used at loading docks to provide a path for loading and unloading goods between a truck bed and a loading dock are in wide use. Such dock plates are generally of heavy metal and require two workers to put in place and move to convenient storage. It would be desirable to provide a dolly for moving and storing a dock plate which allow a single worker to handle and store a dock plate. It would also be desirable if the dolly provides for storage thereon while leaning the dock plate against a wall so as to minimize storage space and remain conveniently placed for later movement.

None of the above inventions and patents, taken either singly or in combination, is seen to describe the instant invention as claimed. Thus, a dolly for metal plates solving the aforementioned problems is desired.

SUMMARY OF THE INVENTION

The dolly for dock plates has an elongate frame and plate edge receiver having a horizontal bottom wall and angled sidewalls extending upward and outward to an upper edge. Front and rear pairs of flanges extend from front and rear portions of the elongate frame at the upper edges thereof for supporting front and rear pairs of castors. The front castors are fixed parallel to the frame, while the rear castors are of the swivel type, allowing change of direction of the dolly. The bottom wall of the frame supports the lower edge of the dock plate during moving and the angled sidewalls allow the dock plate to be stored on the dolly while the dock plate is leaned against a wall for storage. The bottom wall of the frame is at about the height of the castor wheel axles or below for stability of the dolly while moving and storing the dock plate.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is a highly maneuverable dolly for transporting and storing loading dock plates or other heavy metal plates.

Figure 1:
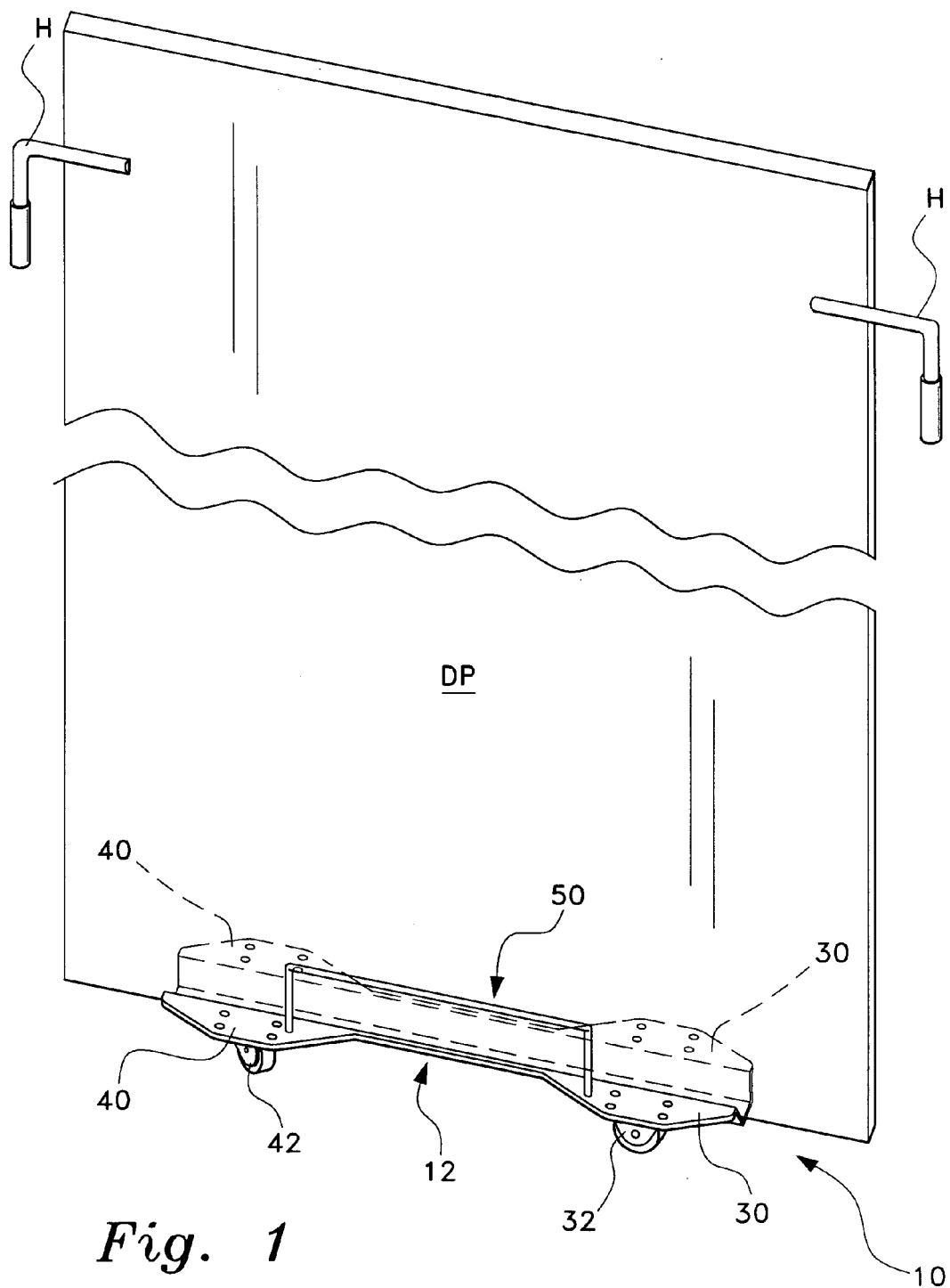
FIG. 1 is an environmental, perspective view of a dolly for dock plates according to the present invention.
Figure 2:
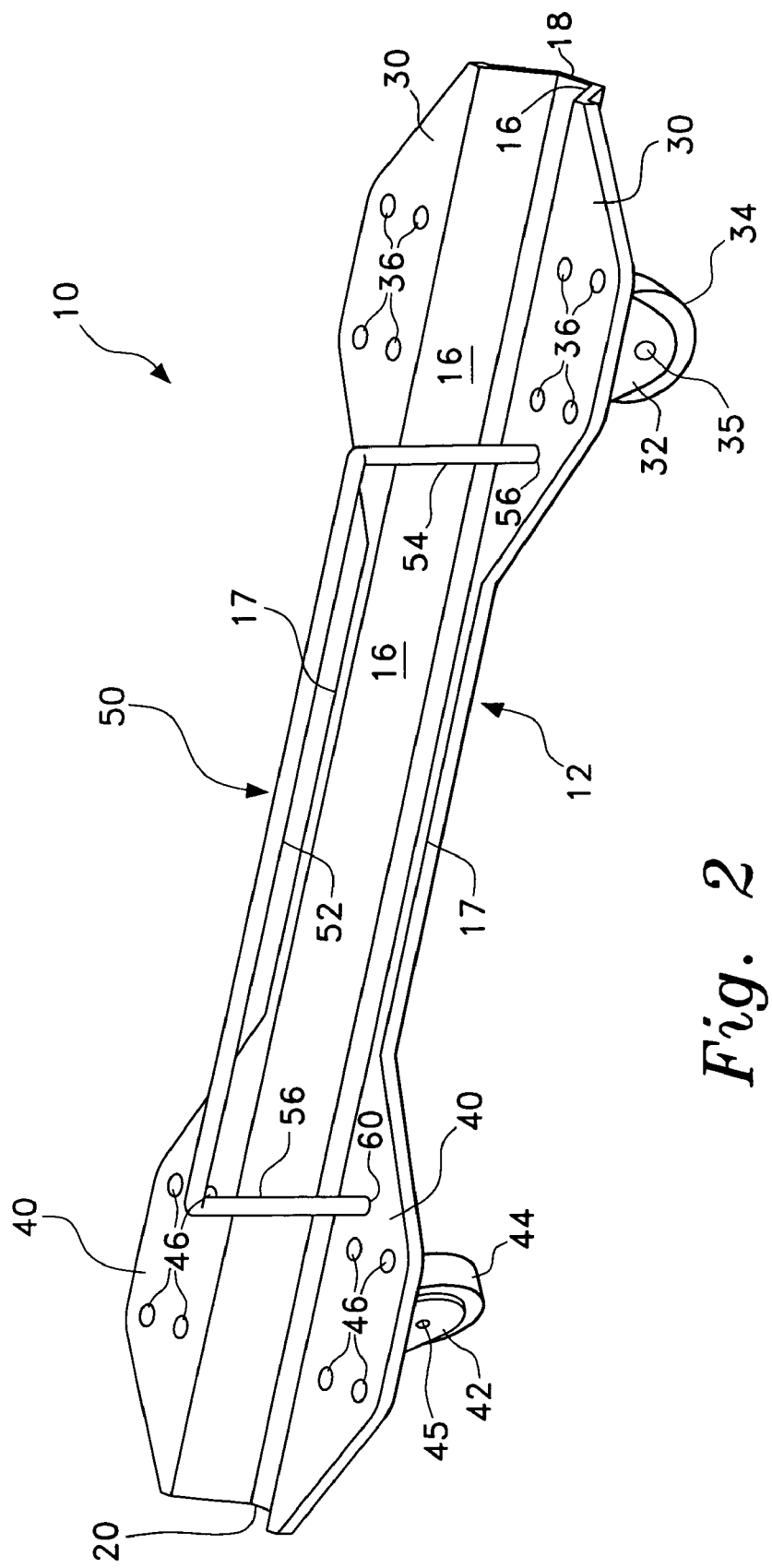
FIG. 2 is a perspective view of the dolly of FIG. 1.
Figure 3:
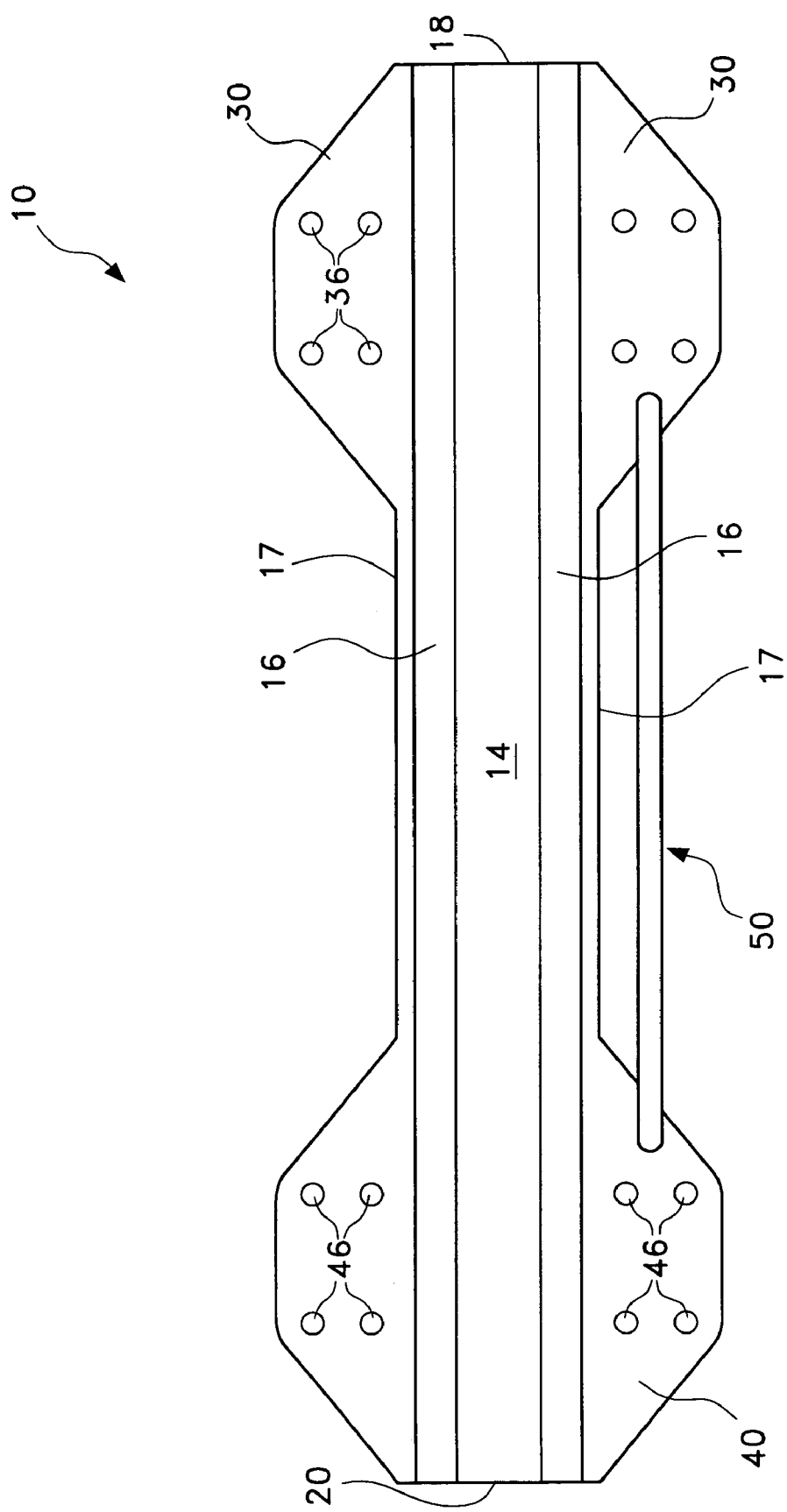
FIG. 3 is a plan view of the dolly of FIG. 1.

Referring to FIG. 1, there is shown an environmental perspective view of the loading dock plate dolly of the present invention referred to herein by the reference No. 10. Dolly 10 is shown bearing a dock plate DP in an upright position as would be the case during movement to or from a storage area by a worker (not shown) as held by a handle H. Dolly 10 has an elongate frame 12 serving as a receiver for the dock plate lower edge. Frame 12 has opposed front castor mounting flanges 30 extending outward from the front portion of frame 12 having respective fixed castors 32 attached to and extending downward therefrom, castors 32 being fixed to travel parallel with the frame 12. Frame 12 has opposed rear mounting castor mounting flanges 40 extending outward from the rear portion of the frame 12 having swivel castors 42 attached to and extending downward therefrom, castors 42 being mounted to swivel for travel in any lateral direction. A handle 50 extends generally parallel with frame 12 and is attached between a rear mounting flange 30 and a front flange 40.

The dock plate DP has upper handles H to assist a worker in handling. A single worker employing the inventive dolly 10 and using a handle H may easily move and store the dock plate DP by tipping the dock plate, resting its lower edge on the dolly 10, and the wheeling the plate to a storage area where the dolly serves as a support while the dock plate is leaned against a wall for storage. Without the inventive dolly, this operation takes two workers to safely accomplish.

Referring to FIGS. 2–5, there is shown a perspective view, a plan view, a side elevation view, and a front elevation view, respectively, of the dolly 10. Dolly 10 has an elongate, plate-receiving and supporting frame 12 having a horizontal bottom wall 14 and two respective outwardly flared sidewalls 16 extending equal distances upward and outward from said bottom wall 14 ending in parallel upper edges 17. Frame 12 defines a front portion 18, a rear portion 20, and a central portion 22.

Front castor mounting flanges 30 attached at frame front end portion 20 are planar, having the shape of a truncated isosceles triangle having the bases forming inner edges and mounted to and extending horizontally outward from the upper edges 17 of sidewalls 16 to form outer edges parallel to the inner edges. Fixed direction castors 32 are mounted on the respective undersides of front castor mounting flanges 30 having wheels aligned parallel with frame 12, the wheels 34 turning on axles 35. Castors 32 are mounted to flanges 30 by fasteners 36 such as rivets. Swivel castors 42 are mounted on the respective undersides of rear castor mounting flanges 40 having wheels 44 turning on axles 45. Rear castor mounting flanges 40 are preferably identical in configuration to front caster mounting flanges 30 and are similarly mounted to the rear portion 18 of elongate frame 12. Castors 42 are mounted to flanges 40 by fasteners 46 such as rivets.

Figure 4:
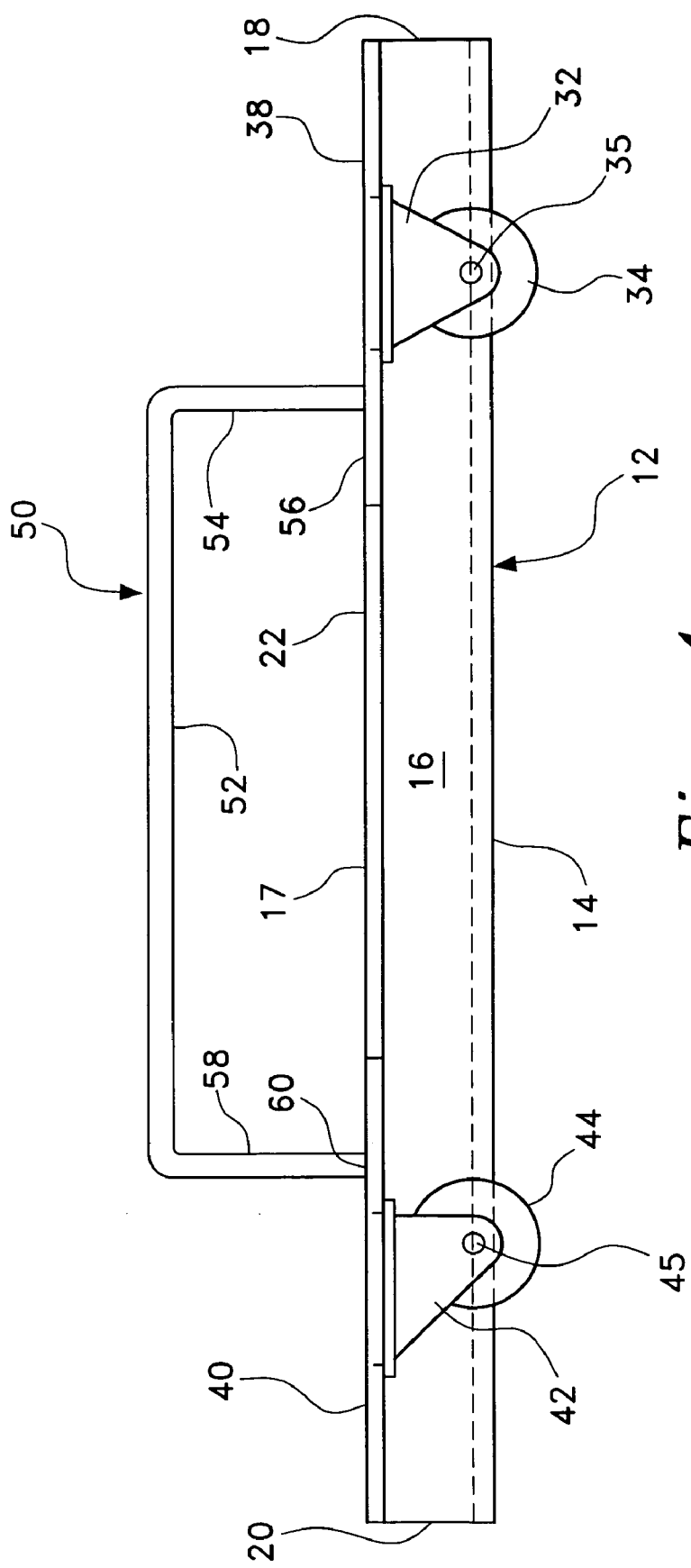
FIG. 4 is a side elevation view of the dolly of FIG. 1.
Figure 5:
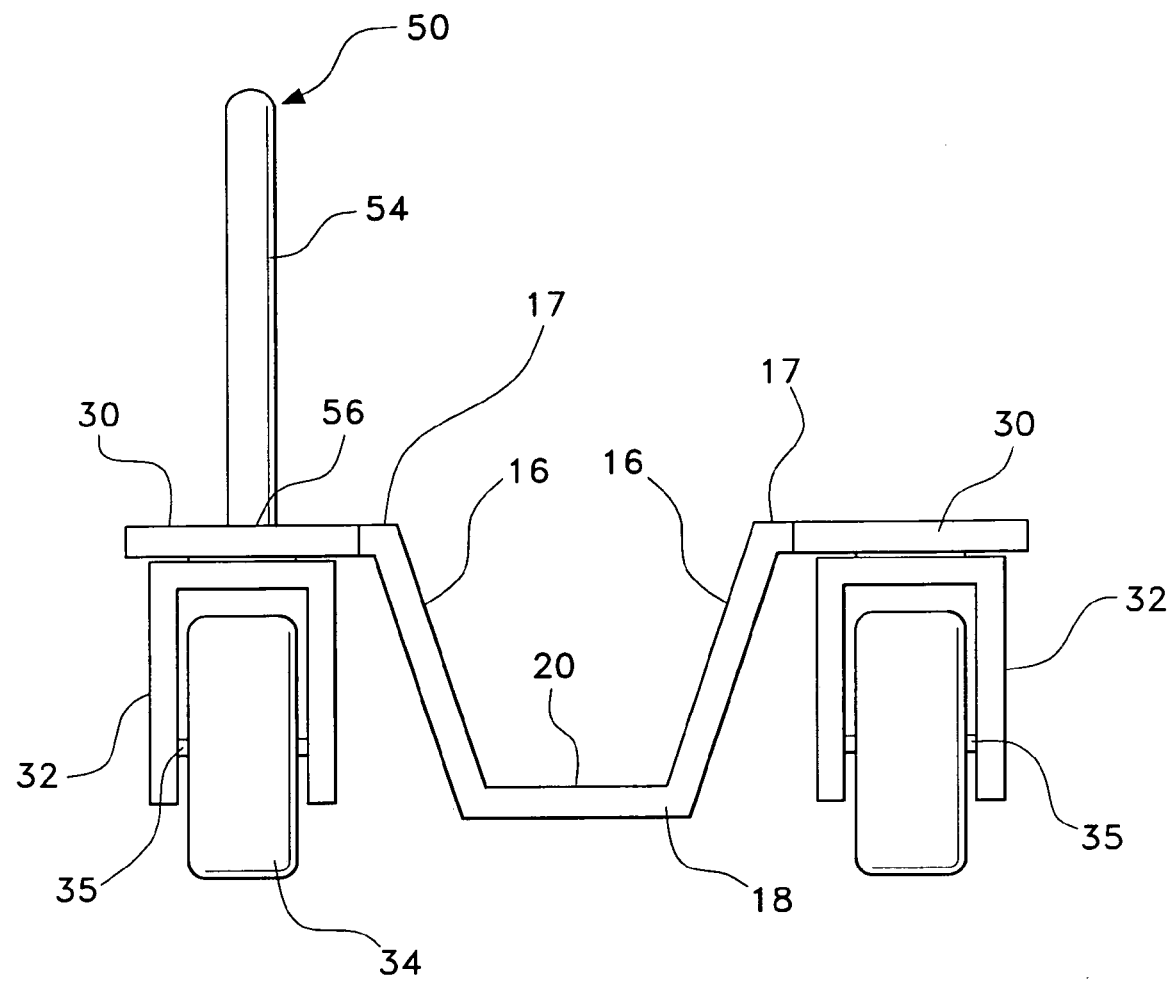
FIG. 5 is an end elevation view of the dolly of FIG. 1.

As is seen in FIGS. 4 and 5, the level of the bottom wall 14 of frame 16 is suspended so as to be at a level about equal to or below castor axles 35 and 45 for stability when moving and supporting while storing a heavy dock plate DP. A handle 50 is of rod stock or the like and has a horizontal portion 52 extending generally parallel with frame 12 between front vertical portion 54 mounted to a the upper surface of a front flange 30 at mounting point 56 and rear vertical portion 58 on mounted to the upper surface of a rear flange 40 at mounting point 60.

In use, a dock plate DP is centrally loaded on the dolly 10 and wheeled to a storage area. The fixed front castors 32 provide for directional stability when the dolly is pushed forward along with the dock plate. The swivel castors 42 allow easy directional shifting of the plate during movement. The dock plate may be held upright relative to the dolly during movement and then leaned at an angle against a wall for storage. The angled sidewalls 16 provide clearance for the angled dock plate during storage. Also, the low height of the bottom wall 14 relative to the axles 35 and 45, provide for stability of the dolly both during moving and during storage of the dock plate. The handle 50 may be used for picking up the dolly 10, hanging for storage, or convenient use by a worker's foot to place the dolly in the correct position to receive the dock plate.

Although not limited to particular dimensions, an example of the dolly of the present invention may be about 25" in overall length with a frame width of 2¼" at the upper edges, a bottom inner wall width of 1⅛" and a depth of about 2". The front and rear mounting brackets are about 5" in base length and 1½" in width tapering at 45-degree angles to about 1⅝". The castors are 2" castors. The handle is about 11¼" in length be 3" in height made of ⅜" diameter steel rod. The frame and flanges are ¼" sheet steel.

It is to be understood that the present invention is not limited to the embodiments described above, but encompasses any and all embodiments within the scope of the following claims.

I claim:

1. A dolly for moving and storing dock plates, comprising:
   an elongate plate receiving frame having a front portion, a rear portion, and a central portion;
   said elongate frame having a horizontal bottom wall and two outwardly flared sidewalls ending in parallel, upper edges of equal height;
   a front pair of planar castor mounting flanges having inner edges and outer edges and extending horizontally outward from said inner edges from respective said frame upper edges at said front portion of said frame;
   at least one front castor mounted to and extending downward from each of said front pair of castor mounting flanges;
   a rear pair of planar castor mounting flanges having inner edges and outer edges and extending horizontally outward from said inner edges from respective said frame upper edges at said rear portion of said frame; and
   a rear castor mounted to and extending downward from each of said rear pair of castor mounting flanges;
   said castors extending downward a distance such that said elongate frame is support for movement;
   whereby said elongate frame receives and supports the lower edge of a dock plate form movement and said outwardly flared sidewalls allow for the leaning of the dock plate against a wall for storage.

2. The dolly of claim 1, wherein each of said front castors are fixed castors having wheel aligned parallel with said elongate frame, and wherein each of said rear castors are swivel castors.

3. The dolly of claim 2, said fixed direction castors and said swivel mounted castors having axles for each of said wheels thereof, said elongate frame being supported such that said bottom wall of said elongate frame is positioned at or below said axles of said castors.

4. The dolly of claim 2, further comprising a handle extending between one of said front planar flanges and one of said rear planar flanges, generally parallel with said elongate frame.

5. The dolly of claim 4, said handle having a horizontal portion extending between said front and said rear planar flanges and front and rear portions mounted on and extending upward from respective said front and said rear planar flanges.

6. The dolly of claim 1, each said horizontal flange being in the general shape of a truncated isosceles triangle having a base forming said inner edges and an outer parallel edge forming said outer edges.

7. A dolly for dock plate moving and storage, comprising:
   an elongate plate receiving frame having a front portion, a rear portion, and a central portion;
   said elongate frame having a horizontal bottom wall and two outwardly flared sidewalls ending in parallel, upper edges of equal height;
   a front pair of planar castor mounting flanges having inner edges and outer edges and extending horizontally outward from said inner edges from respective said frame upper edges at said front portion of said frame;
   at least one fixed direction castor mounted to and extending downward from each of said front pair of castor mounting flanges, each of said fixed castors having a wheel directed parallel to said elongate frame;
   a rear pair of planar castor mounting flanges having inner edges and outer edges and extending horizontally outward from said inner edges from respective said frame upper edges at said rear portion of said frame; and
   a swivel castor mounted to and extending downward from each of said rear pair of castor mounting flanges, each of said front pair of castors being mounted so as to swivel to allow change of direction of said dolly;
   said fixed direction castors and said swivel mounted castors extending downward a distance such that said elongate frame is support for movement;
   said fixed direction castors and said swivel mounted castors having axles for each of said wheels thereof, said elongate frame being supported such that said bottom wall of said elongate frame is positioned at or below said axles of said castors.

8. The dolly of claim 7, further comprising a handle extending between one of said front planar flanges and one of said rear planar flanges, generally parallel with said elongate frame.

9. The dolly of claim 7, said handle having a horizontal portion extending between said front and said rear planar flanges and front and rear portions mounted on and extending upward from respective said front and said rear planar flanges.

10. The dolly of claim 7, each said horizontal flange being in the general shape of a truncated isosceles triangle having a base forming said inner edges and an outer parallel edge forming said outer edges.

11. A dolly for dock plate moving and storage, comprising:
    an elongate plate receiving frame having a front portion, a rear portion, and a central portion;
    said elongate frame having a horizontal bottom wall and two outwardly flared sidewalls ending in parallel, upper edges of equal height;
    a front pair of planar castor mounting flanges having inner edges and outer edges and extending horizontally outward from said inner edges from respective said frame upper edges at said front portion of said frame;

at least one fixed direction castor mounted to and extending downward from each of said front pair of castor mounting flanges, each of said fixed castors having a wheel directed parallel to said elongate frame;

a rear pair of planar castor mounting flanges having inner edges and outer edges and extending horizontally outward from said inner edges from respective said frame upper edges at said rear portion of said frame;

a swivel castor mounted to and extending downward from each of said rear pair of castor mounting flanges, each of said front pair of castors being mounted so as to swivel to allow change of direction of said dolly; and a handle extending between one of said front planar flanges and one of said rear planar flanges, generally parallel with said elongate frame;

said fixed direction castors and said swivel mounted castors extending downward a distance such that said elongate frame is support for movement;

said fixed direction castors and said swivel mounted castors having axles for each of said wheels thereof, said elongate frame being supported such that said bottom wall of said elongate frame is positioned at or below said axles of said castors; and said handle having a horizontal portion extending between said front and said rear planar flanges and front and rear portions mounted on and extending upward from respective said front and said rear planar flanges.

12. The dolly of claim 11, each said horizontal flange being in the general shape of a truncated isosceles triangle having a base forming said inner edges and an outer parallel edge forming said outer edges.

* * * * *